US011816162B2

(12) United States Patent
Tambi et al.

(10) Patent No.: US 11,816,162 B2
(45) Date of Patent: Nov. 14, 2023

(54) METHODS AND SYSTEMS FOR SEARCH QUERY LANGUAGE IDENTIFICATION

(71) Applicant: Adobe Inc., San Jose, CA (US)

(72) Inventors: Ritiz Tambi, San Francisco, CA (US); Ajinkya Kale, San Jose, CA (US); Tracy Holloway King, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 314 days.

(21) Appl. No.: 16/944,203

(22) Filed: Jul. 31, 2020

(65) Prior Publication Data

US 2022/0035867 A1  Feb. 3, 2022

(51) Int. Cl.

| G06F 16/90 | (2019.01) |
|---|---|
| G06F 16/9032 | (2019.01) |
| G06F 40/263 | (2020.01) |
| G06F 40/242 | (2020.01) |
| G06F 16/903 | (2019.01) |
| G06N 20/00 | (2019.01) |

(Continued)

(52) U.S. Cl.
CPC .. *G06F 16/90324* (2019.01); *G06F 16/90344* (2019.01); *G06F 18/2155* (2023.01); *G06F 18/24147* (2023.01); *G06F 40/242* (2020.01); *G06F 40/263* (2020.01); *G06N 20/00* (2019.01)

(58) Field of Classification Search
CPC ......... G06F 16/90324; G06F 16/90344; G06F 40/242; G06F 40/263; G06F 16/90332; G06K 9/6259; G06K 9/6276; G06N 20/00; G06N 5/022; G06N 5/003; G06N 20/20; F06F 16/90324

USPC ......................................................... 707/713
See application file for complete search history.

(56) References Cited

U.S. PATENT DOCUMENTS

| 8,224,836 B1 * | 7/2012 | Piratla .................. G06F 16/951 707/769 |
|---|---|---|
| 2018/0032900 A1 * | 2/2018 | Chowdhury ........... G06N 20/10 |

(Continued)

OTHER PUBLICATIONS

Baldwin, T. and Lui, M. (2010). Language identification: The long and the short of the matter. In Proceedings of NAACL HLT 2010, pp. 229-237.

(Continued)

*Primary Examiner* — Syling Yen
(74) *Attorney, Agent, or Firm* — FIG. 1 Patents

(57) ABSTRACT

Systems and methods are disclosed for search query language identification. One method comprises generating a seed dictionary comprising a plurality of labeled dictionary terms and receiving a plurality of unlabeled sample query terms. The plurality of unlabeled sample query terms are compared to the plurality of labeled dictionary terms at a first time, and a first set of labeled sample query terms are generated by labeling at least a subset of the plurality of unlabeled sample query terms based on the first comparison. Remaining unlabeled sample query terms are then compared with the first set of labeled sample query terms at a second time, and a second set of labeled sample query terms are generated by labeling the remaining unlabeled sample query terms based on the second comparison. The first and second sets of labeled sample query terms are provided to a machine learning model configured for query language prediction.

20 Claims, 7 Drawing Sheets

(51) Int. Cl.
  *G06F 18/214* (2023.01)
  *G06F 18/2413* (2023.01)

(56) References Cited

U.S. PATENT DOCUMENTS

2020/0034419 A1* 1/2020 Bondugula ............. G06F 16/35
2021/0334299 A1* 10/2021 Sonntag ................ G06F 16/335

OTHER PUBLICATIONS

Baldwin, T., Cook, P., Lui, M., MacKinlay, A., and Wang, L. (2013). How noisy social media text, how different social media sources? In International Joint Conference on Natural Language Processing, pp. 356-364.

Bekker, A. J., Opher, I., Lapidot, I., and Goldberger, J. (2016). Intra-cluster training strategy for deep learning with applications to language identification. In IEEE International Workshop on Machine Learning for Signal Processing.

Bojanowski, P., Grave, E., Joulin, A., and Mikolov, T. (2016). Enriching word vectors with subword information. In CoRR.

Carter, S., Weerk, W., and Tsagkias, M. (2013). Microblog language identification: overcoming the limitations of short, unedited and idiomatic text. Language Resources and Evaluation, pp. 195-215.

Cavnar, W. B. and Trenkle, J. M. (1994). Ngram-based text categorization. In Proceedings of the Third Symposium on Document Analysis and Information Retrieval.

Ceylan, H. and Kim, Y. (2009). Language identification of search engine queries. In Proceedings of ACL2009, pp. 1066-1074.

Conneau, A., Lample, G., Denoyer, L., Ranzato, M., and Jégou, H. (2018). Word translation without parallel data. In ICLR.

Fernando, S., Sethu, V., Ambikairajah, E., and Epps, J. (2017). Bidirectional modelling for short duration language identification. In INTERSPEECH.

Figure Eight Inc. (Dec. 18, 2019). How Figure Eight Works. https://www.figure-eight.com/platform/how-figure-eight-works/.

Grave, E. (2017). Language identification. Blog post at https://fasttext.cc/blog/2017/10/02/blog-post.html.

Hammarstrom, H. (2007). A fine-grained model for language identification. In Proceedings of iNEWS07, pp. 14-20.

Johnson, J., Douze, M., and Jegou, H. (2017). Billionscale similarity search with GPUs. arXiv preprint arXiv:1702.08734.

Joulin, A., Grave, E., Bojanowski, P., and Mikolov, T. (2016). Bag of tricks for efficient text classification. arXiv preprint arXiv: 1607.01759.

Lui, M. and Baldwin, T. (2011). Cross-domain feature selection for language identification. In Proceedings of 5th International Joint Conference on Natural Language Processing, pp. 553-561.

Lui, M. and Baldwin, T. (2012). Langid.py: An off-theshelf language identification tool. In Proceedings of the ACL 2012 System Demonstrations, ACL '12, pp. 25-30. Association for Computational Linguistics.

McCallum, A. and Nigam, K. (1998). A comparison of event models for Naive Bayes text classification. In Proceedings of the AAAI-98Workshop on Learning for Text Categorization.

Sibun, P. and Reynar, J. C. (1996). Language identification: Examining the issues. In Proceedings of the 5th Annual Symposium on Document Analysis and Information Retrieval, pp. 125-135.

Sun, X., Wang, H., Xiao, Y., and Wang, Z. (2016). Syntactic parsing of web queries. In Proceedings of the 2016 Conference on Empirical Methods in Natural Language Processing, pp. 1787-1796. Association for Computational inguistics.

Travadi, R., Van Segbroeck, M., and Narayanan, S. (2014). Modified prior i-vector estimation for language identification of short duration utterances. In Proceedings of Interspeech.

Vatanen, T., Vayrynen, J. J., and Virpioja, S. (2010). Language identification of short text segments with n-gram models. In Proceedings of LREC 2010, pp. 423-3430.

Wang, Z., Wang, H., and Hu, Z. (2014). Head, modifier, and constraint detection in short texts. In Proceedings—International Conference on Data Engineering, pp. 280-291, 03.

Zhang, Y., Riesa, J., Gillick, D., Bakalov, A., Baldridge, J., and Weiss, D. (2018). A fast, compact, accurate model for language identification of codemixed text. arXiv:1810.04142v1.

* cited by examiner

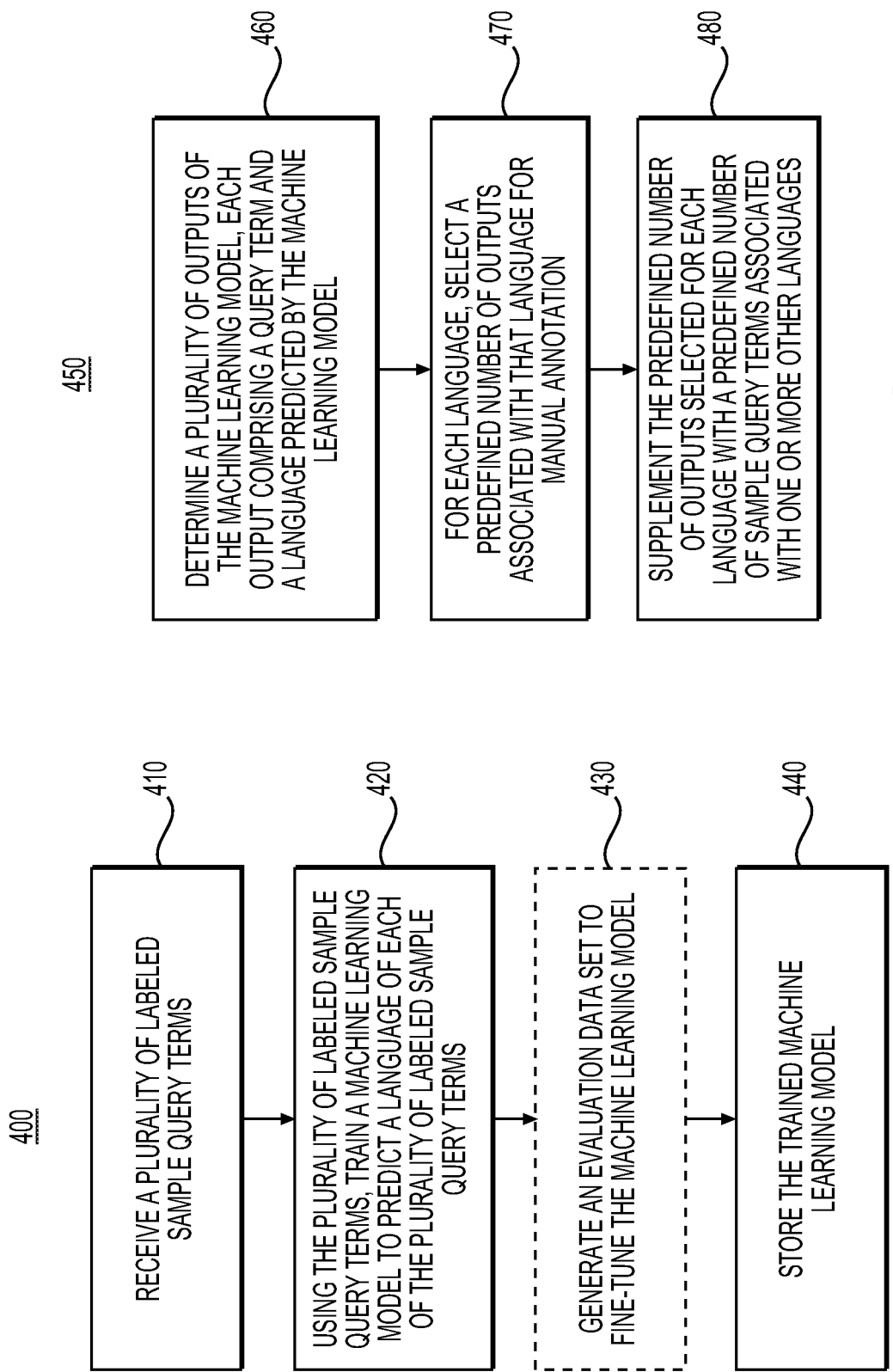

METHODS AND SYSTEMS FOR SEARCH QUERY LANGUAGE IDENTIFICATION

TECHNICAL FIELD

The present disclosure relates to systems and methods for search query language identification. More particularly, the present disclosure relates to systems and methods for weak-labeling training data for a machine learning model configured to identify a search query language.

BACKGROUND

Conventional language identification systems are generally trained on well edited text. For example, conventional language identification systems are trained based on a variety of signals, such as known closed class words (e.g., determiners and auxiliaries), character n-grams (e.g., trigrams), punctuation and spaces, upper and lower casing, etc. Such conventional language identification systems may work for longer texts that have similar editing style and signals. However, the overall performance of such systems drops significantly against shorter text, such as, for example, search queries, short posts made on social media platforms (e.g., "tweets"), file names, and the like.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining a language of a query using a machine learning model. The present disclosure proposes the process of generating weak-labeled training data in addition to human-annotated evaluation data, in order to train a machine learning model configured for search query language identification.

In the present disclosure, weak-labeled training data refers to training data that are annotated (i.e., labeled) using one or more computer algorithms. Such training data is described as "weak-labeled" since the labels are computer-generated and therefore associated with an error rate. To create the weak-labeled training data, a seed dictionary containing terms labeled with corresponding languages (i.e., labeled dictionary terms) is used to annotate sample query terms retrieved from query logs. Specifically, the nearest neighbors, i.e., the nearest sample query terms of each dictionary term are found using a k-Nearest Neighbors (kNN) model. The nearest sample query terms identified for each dictionary term are then annotated with the language of the dictionary term, forming an initial set of labeled sample query terms.

Once this initial set of labeled sample query terms is generated, the training data set is expanded by identifying remaining sample query terms in the query log (and/or from additional data sources) and annotating the remaining sample query terms with appropriate languages. To that end, the nearest neighbors, i.e., the nearest labeled sample query terms of each remaining sample query term are found using a kNN model. Each remaining sample query term is then annotated (i.e., labeled) with a language based on the languages of the nearest labeled sample query terms. The language assigned to the sample query term is selected among the languages of the nearest labeled sample query terms using, for example, a majority vote scheme.

A machine learning model configured for search query language identification is trained using the weak-labeled training data. In some embodiments, the weak-labeled training data may be supplemented with human-annotated evaluation data for model parameter tuning. The trained machine learning model is used to predict a language of a search query. The predicted language may be utilized in providing personalized information to users and extracting insights as to what languages are being used by users under what context (e.g., characteristics of a web site or software application at which search queries are submitted). As an example, a user interface with graphical elements and texts in the predicted language is provided to a user, instead of a user interface generated based on a default language or a language foreign to the user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4A is a flowchart illustrating an exemplary method of training a machine learning model, according to one aspect of the current disclosure.

FIG. 4B is a flowchart illustrating an exemplary method of generating an evaluation data set, according to one aspect of the current disclosure.

DETAILED DESCRIPTION OF EMBODIMENTS

Figure 1:
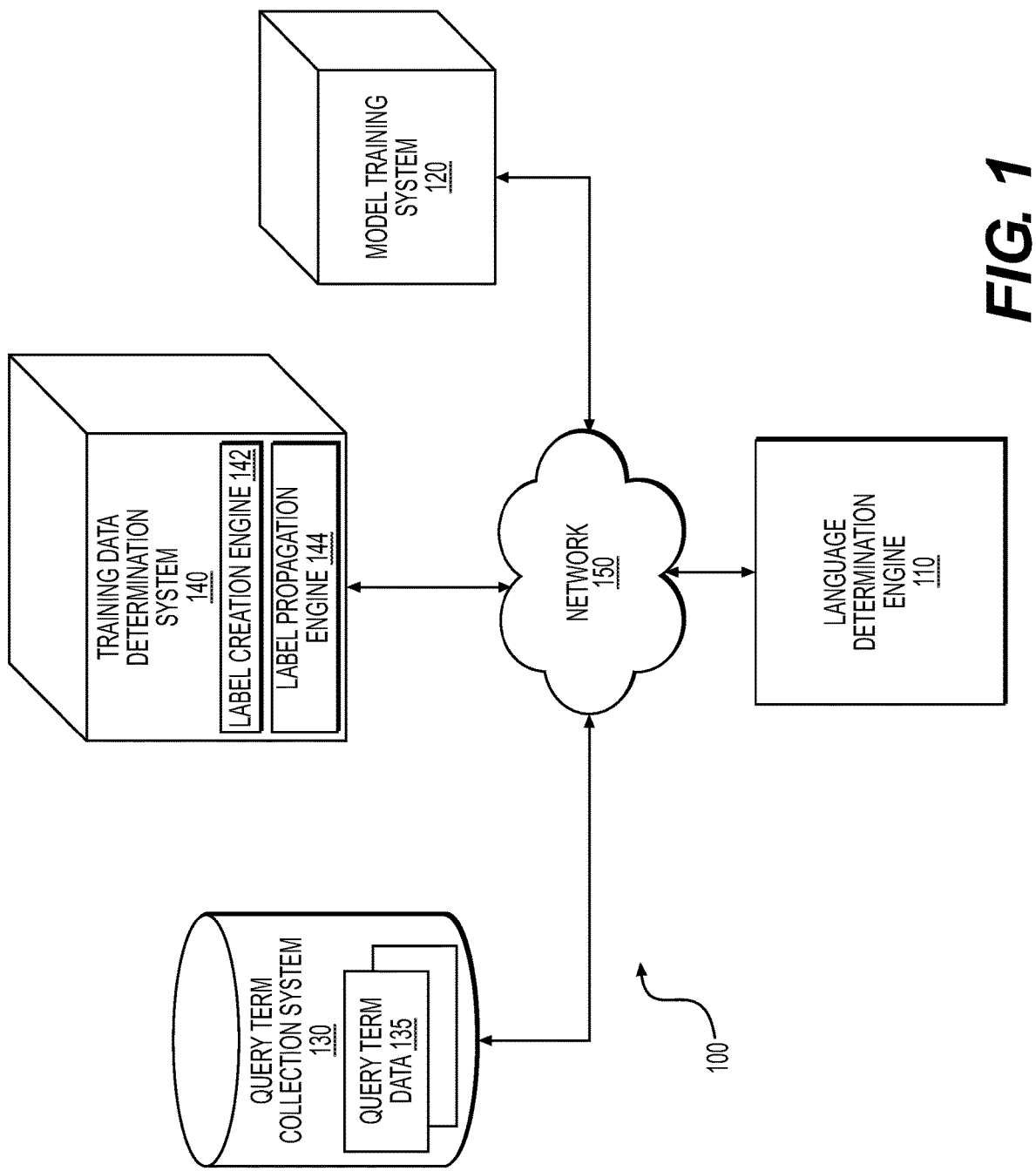
FIG. 1 shows an exemplary system infrastructure of a language determination system 100, according to one aspect of the current disclosure.

The following embodiments describe systems and methods for search query language identification and, more particularly, for weak-labeling training data provided to a machine learning model that is configured to identify a language of a search query.

Language identification is key to accurately applying deep natural language processing in contexts where the language of the text is initially unknown. As such, language identification techniques can be used to classify texts by language and ensure that a collected set of texts are all in the same language. The present disclosure focuses on language identification for text having relatively shorter lengths, such as search queries, for example. Search queries sometimes include keywords that reflect vocabulary used to describe items in the world (e.g., dog, woman, coffee cup), abstract concepts (e.g., happiness, success), and some domain/application-specific vocabulary (e.g., icon, vector, background). Language identification techniques that work for queries can be valuable for tasks, such as named entity recognition and dependency parsing, in order to improve query understanding and search result quality. Additionally, language identification techniques can enable autocomplete suggestions and related searches to be provided in the correct language. Further, language identification techniques can be used to set the language of a particular web page automatically or by asking the user whether he/she would like to switch to the identified language. Furthermore, a user profile can be created based on the identified language, and used for user interface or data personalization in the future. These are just some of many use cases achievable using language identification techniques.

Conventionally, language identification systems are trained on well-edited text and utilize a variety of language-identifying signals including: known words and especially known closed class words (e.g., determiners, auxiliaries), character n-grams (e.g., tri-grams), punctuations and spaces, upper and lower casing, etc. These general-purpose language identification models work well for longer text with similar editing style. However, the performance of such systems decreases against shorter text, such as search queries, short online posts, and the like. There are two reasons for this shortcoming. First, shorter text provides less language-identifying signals, especially for discriminating between similar languages (e.g., between the Scandinavian languages). However, the degradation is often much greater than expected. This is due to the second reason, namely that short texts are often missing many of the language-identifying signals that are seen in training data. For example in search queries, capitalization is almost meaningless, misspellings occur frequently, punctuation is often missing or used differently, closed class words are typically dropped, and spacing and punctuation often reflect the native language of the user device (e.g., a keyboard) and not the actual language of the user. Unlike in long text, a typical search query includes some prepositions (e.g., boy on beach) but almost no determiners or auxiliaries, and verbs are generally progressive participles (e.g., man sitting at computer). Additionally, in short online posts made by users (e.g., tweets) and certain search domains, specialized vocabulary (e.g., hashtags, model numbers, brand names, etc.) often have character n-grams that are more in line with other languages.

Therefore, language detection for relatively shorter text remains a challenging task, and conventional methods and systems utilizing out-of-the-box language identifiers suffer from low accuracy with respect to shorter text. One of the principal causes could be in the lack of sufficient amount of labeled short texts (e.g., search queries) that can be used to train machine learning models. Human-labeling a sufficient amount of search queries for supervised model training is prohibitively expensive and time consuming.

To overcome or alleviate the above-mentioned challenges, the present disclosure describes techniques for generating weak-labeled training data and human-annotated evaluation data, in order to train and evaluate a machine learning model configured to identify languages associated with relatively shorter text. As explained above in the Summary of the Disclosure section, training data discussed in the present disclosure are described as "weak-labeled" since they are annotated using one or more computer algorithms and thus associated with an error rate. The training data is generated by taking a seed dictionary comprising known language terms (i.e., labeled dictionary terms) and finding their nearest neighbors among query terms retrieved from query logs (i.e., nearest unlabeled sample query terms). The nearest unlabeled sample query terms then "inherit" the labels, i.e., languages associated with the corresponding labeled dictionary terms. This first stage of "weak labeling" may be referred to as a label creation phase.

Once a set of labeled sample query terms is obtained, the training data set is expanded by identifying remaining sample query terms in the query log (or from additional data sources) and annotating the remaining sample query terms with appropriate languages. To that end, the nearest neighbors, i.e., the nearest labeled sample query terms of each remaining sample query term are found. Each remaining sample query term is then annotated (i.e., labeled) with a language based on the languages of the nearest labeled sample query terms. This second stage of "weak labeling" may be referred to as a label propagation phase.

In some embodiments, once the training data is generated via weak labeling (i.e., once weak-labeled sample query terms are generated), a machine learning model configured to detect a language of a query is trained using the training data. To evaluate the model, a portion of the training data is manually annotated through a crowd-sourcing task. To further ensure accuracy, a task may be assigned to human annotators with respect to each language, with instructions provided only in that language in order to reduce the chances of human annotators who do not know the language performing the task. In some embodiments, queries from other languages are mixed in with the target language, the other languages largely comprising English and languages likely to be confused with the target language.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Certain relative terms used in this disclosure, such as, for example, "about," "substantially," "generally," and "approximately" are used to indicate a possible variation of ±10% of a stated or understood value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 shows an exemplary system infrastructure of a language determination system 100, according to one aspect of the current disclosure. In one embodiment, the language determination system 100 includes a language determination engine 110, a model training system 120, a query term collection system 130, and a training data determination system 140, all communicably connected via a network 150. The network 150 may include the Internet, but may also include other networks such as a corporate WAN, cellular network, satellite network, or combination thereof, for example. The network 150 is employed to enable data communications between the various entities illustrated in FIG. 1.

Figure 6:
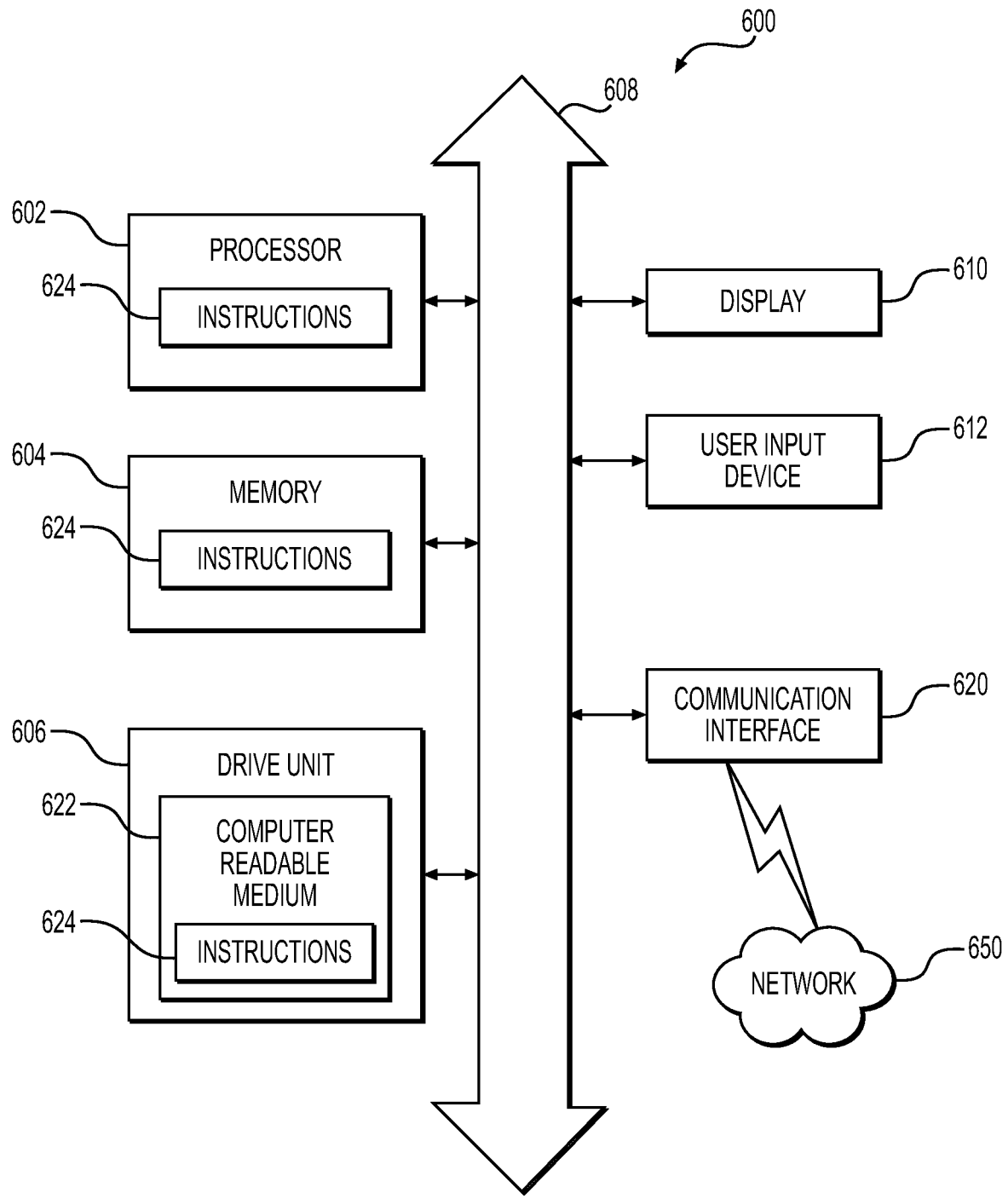
FIG. 6 illustrates an implementation of a computer system that may execute techniques presented herein.

In one embodiment, the language determination engine 110 is part of a software application that is installed on a computing device consistent with or similar to that depicted in FIG. 6. For example, the language determination engine 110 is part of an image storage and search application, such as, e.g., Adobe Stock. The language determination engine 110 can be implemented with any software application in which a need for determining a language associated with text may arise. Alternatively, the language determination engine 110 may itself be a standalone application in communication with another software application in need of language determination capability.

The language determination engine 110 uses a trained machine learning model to determine a language associated with text. In particular, the machine learning model and the training data disclosed herein are advantageous in determining a language associated with relatively shorter text. Such shorter text may include search queries, short texts posted on online sites or applications (e.g., tweets), short texts entered in web-based or client-side applications, image captions, document titles, file names, and the like. However, it should be noted that the techniques disclosed in the present disclosure are applicable also to relatively longer text (e.g., documents, paragraphs, emails, etc.). For the sake of simplicity, relatively shorter text to which the techniques of the present disclosure are tailored and/or applicable will be referred to as search queries.

In one embodiment, the machine learning model used by the language determination engine 110 comprises a Gradient Boosted Trees (GBT) model configured to solve regression and/or classification problems. A GBT model uses an ensemble of decision trees to predict a target label for given data. More specifically, a GBT model utilized in the present disclosure may be based on Xgboost, CatBoost, or LightGBM. It should be noted that other types of machine learning model suitable for determining a language of text may also be used.

With renewed reference to FIG. 1, the model training system 120 comprises one or more computer servers consistent with or similar to that depicted in FIG. 6. The model training system 120 comprises a single server, or a plurality of servers distributed across the network 150. Notably, the model training system 120 receives training data from the training data determination system 140 and trains a machine learning model based on the training data. The model training system 120 provides the trained machine learning model to the language determination engine 110 to determine a language for search queries received by the language determination engine 110.

The training data determination system 140 comprises one or more computer servers consistent with or similar to that depicted in FIG. 6. The training data determination system 140 comprises a single server, or a plurality of servers distributed across the network 150. Notably, the training data determination system 140 obtains query term data 135 comprising a plurality of sample query terms from the query term collection system 130, and prepares the sample query terms to be usable or consumable by the machine learning model being trained at the model training system 120. Such "preparation" may be performed by the components of the training data determination system 140, namely a label creation engine 142 and a label propagation engine 144.

The label creation engine 142 creates labels for (i.e., annotates) the sample query terms by comparing the sample query terms with a seed dictionary comprising a plurality of seed dictionary terms, i.e., labeled dictionary terms. Each dictionary term in the seed dictionary is annotated with a corresponding language, such that the label appended thereto indicates the language of the dictionary term. Similarly, the sample query terms annotated by the label creation engine 142 each include a label indicative of the corresponding language. The sample query terms annotated by the label creation engine 142 will thus be referred to as labeled sample query terms. The manner in which the sample query terms are compared with the labeled dictionary terms for annotation will be discussed in greater detail in reference to FIG. 2 and FIG. 3A.

The label propagation engine 144 creates labels for sample query terms that are not annotated by the label creation engine 142. As will be explained in detail below, certain sample query terms that are not "similar" enough to the labeled dictionary terms can remain unlabeled. The label propagation engine 144 processes such remaining sample query terms utilizing the sample query terms previously annotated by the label creation engine 142 (i.e., utilizing the labeled sample query terms). Each remaining sample query term is compared with the labeled sample query terms to identify a predefined number of most "similar" labeled sample query terms. The label for the remaining sample query term is determined based on the languages of the most similar labeled sample query terms, in accordance with a voting scheme. The details of label propagation performed by the label propagation engine 144 will be discussed in greater depth in reference to FIG. 2 and FIG. 3B. In summary, the label creation and propagation processes allow for supervised machine learning without having to manually annotate a large amount of training data.

The query term collection system 130 comprises one or more computer servers consistent with or similar to that depicted in FIG. 6. The query term collection system 130 comprises a single server, or a plurality of servers distributed across the network 150. Notably, the query term collection system 130 collects and stores query term data 135, which are accessible to the training data determination system 140. The query term data 135 comprise sample query terms collected from one or more sources that are to be "prepared" (e.g., labeled) for model training. In one embodiment, the sample query terms are collected from one or more sources providing search interfaces to users. As an example, the sample query terms are collected from an image search and storage platform such as Adobe Stock, which retains a log of previously-submitted queries (i.e., a query log). Additionally or alternatively, the sample query terms are collected from other types of sources storing queries such as online search platforms, user applications with local and/or remote search capabilities, repositories configured to receive and store queries from a variety of search platforms, and so forth.

It should be noted that, although the language determination engine 110, model training system 120, query term collection system 130, and training data determination system 140 are shown as separate entities in FIG. 1, all or a portion of these components (and the steps performed thereof) may be implemented in a single computing device consistent with or similar to that depicted in FIG. 6, or may be implemented in more than one computing device consistent with or similar to that depicted in FIG. 6 in a distributed manner. In other words, one of ordinary skill will recognize that the configurations specifically discussed herein regarding the arrangement of the components depicted in FIG. 1 are merely exemplary, and it would be obvious to a person of ordinary skill in the relevant art that different combinations of components may be implemented on a single or multiple computing devices.

Figure 2:
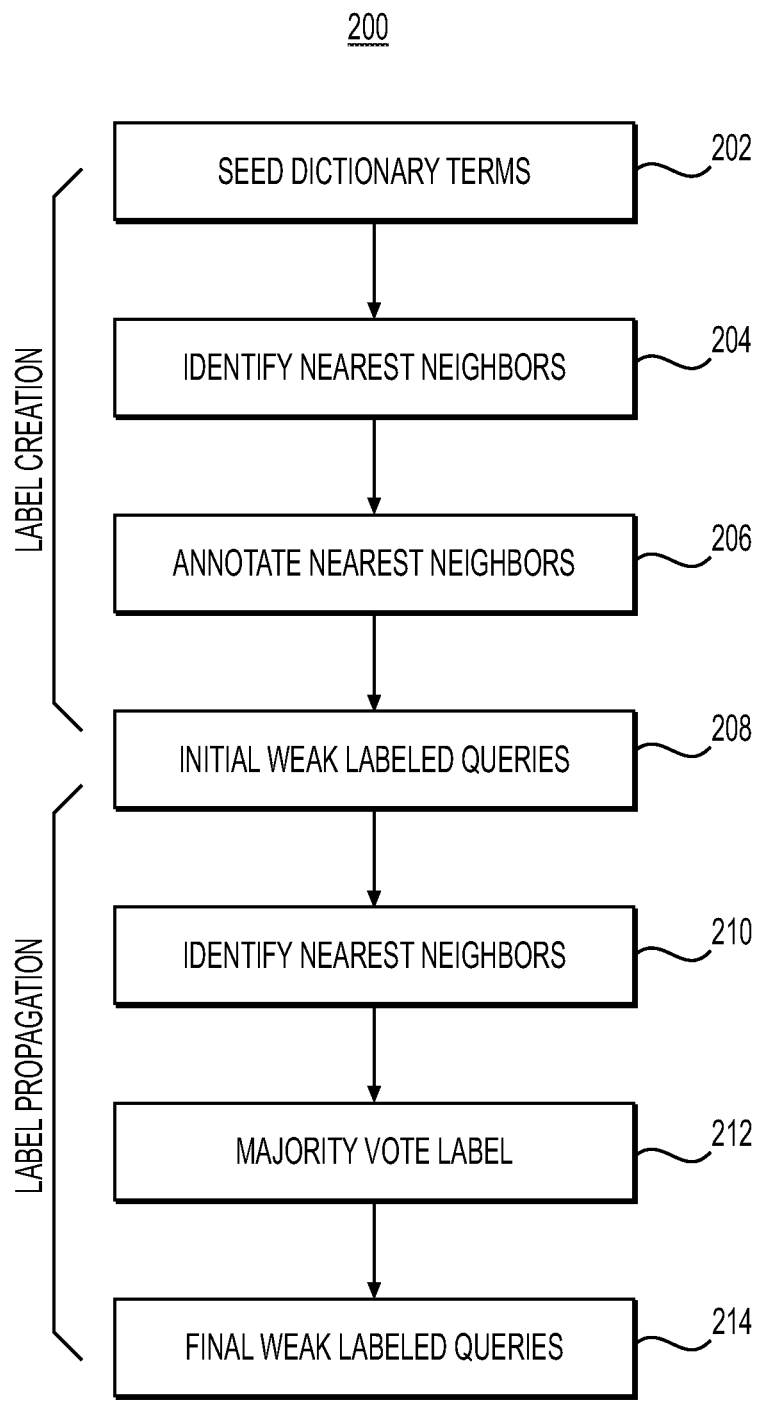
FIG. 2 is a flowchart illustrating an exemplary method of generating a weak-labeled training data set for a machine learning model, according to one aspect of the current disclosure.

FIG. 2 is a flowchart illustrating an exemplary method of generating a weak-labeled training data set for a machine learning model, according to one aspect of the current disclosure. Notably, method 200 is executed by the training data determination system 140. The process of weak-labeling training data includes two main phases, namely a label creation phase and a label propagation phase. The steps of the label creation phase are executed by the label creation engine 142 and the steps of the label propagation phase are executed by the label propagation engine 144.

At step 202, the label creation engine 142 generates or receives a seed dictionary comprising a plurality of seed dictionary terms (i.e., labeled dictionary terms). As explained above, each dictionary term in the seed dictionary is annotated with a corresponding language, such that the label appended thereto indicates the language of the dictionary term. In one embodiment, the seed dictionary terms are in a single language, enabling identification of that single language with respect to query terms in subsequent steps. In other embodiments, the seed dictionary terms are in multiple languages, allowing identification of multiple languages in query terms. In other words, the seed dictionary includes terms from various languages, each term being annotated with the corresponding language. The seed dictionary is compiled from external dictionary sources such as, e.g., Multilingual Unsupervised and Supervised Embeddings (MUSE) dictionaries. For example, the MUSE dictionaries are compiled for creating multilingual word embeddings. It should be noted that the seed dictionary may be configured to include terms in any number of languages, and the number of languages represented by the seed dictionary is configurable by the programmer, developer, or administrator of the language determination system 100.

At step 204, the label creation engine 142 identifies nearest neighbors of each seed dictionary term. As explained above, candidate data elements that may constitute nearest neighbors of the seed dictionary terms are query terms retrieved from one or more query logs. Therefore, the label creation engine 142 essentially finds query terms that are nearest to each seed dictionary term at step 204. The query terms retrieved from the query log(s) are initially unlabeled.

In one embodiment, the nearest query terms are found using a kNN model, with the constant k defining the number of nearest query terms to be identified. For each seed dictionary term, a predefined number (i.e., k) of nearest query terms are found based on the distances (e.g., Euclidean distances) between the seed term and the query terms. In other embodiments, any suitable classification algorithm may be utilized to find query terms that are most similar (in terms of distance, proximity, or closeness) to each seed dictionary term.

In the case of utilizing a kNN model, it is important to obtain optimal query vectors or other abstract query representations in training the model. In an experiment conducted to find optimal query vectors, a fastText skipgram model was trained on a large number (e.g., over 6 million) of queries retrieved from one or more sources (e.g., query logs in Adobe Stock). An optimal fastText model was found by a similarity analysis. Multiple fastText models were trained on a variety of parameters. For finding the nearest neighbors, a Faiss index model was trained. A separate Faiss index was also trained for each of the query vector sets obtained from the different fastText models. The following fastText parameters were used:

Vector dimensions: 100, 300
Minimum character subword size (n): 1, 2, 3
Maximum n: 4, 5, 6

For the similarity analysis, the model with a minimum n of 1 and a maximum n of 4 were chosen for converting the textual queries to sentence vectors. Choosing a minimum n of 1 boosted the similarity values for the non-Latin script languages. Faiss Nearest Neighbor indices utilized all the cores of the computing system and prevented any other task from utilizing the multiprocessing capabilities of the computing system. It should be noted that other settings and/or models may be optimal for other types of query sets or text (e.g., query sets or text retrieve from other sources).

With renewed reference to FIG. 2, at step 206, the label creation engine 142 annotates the identified nearest neighbors based on the corresponding seed terms. More specifically, the label creation engine 142 annotates the query terms nearest to each seed dictionary term, with the language associated with the corresponding seed dictionary term. At step 208, the label creation engine 142 obtains an initial set of labeled (i.e., weak-labeled) query terms as a result of the annotation process at step 206.

Table 1 below shows results of an experiment performed in accordance with the above-described label creation phase. In particular, Table 1 shows the number and distribution of seed dictionary terms and their corresponding nearest query terms that are annotated (i.e., Labeled Queries). For this experiment, MUSE dictionaries were used to compile seed terms from eight different languages (i.e., English, German, Japanese, Korean, French, Italian, Spanish, Portuguese), and the kNN model was used to identify the nearest query terms. In Table 1, and subsequent tables and description related to the experiment, data for Korean is omitted as the model was extremely accurately in predicting the Korean language, due to certain properties unique to the Korean character set.

TABLE 1

| Language | Seeds | Labeled Queries |
|---|---|---|
| English | 92,843 (37.7%) | 52,777 (28.1%) |
| German | 27,892 (11.3%) | 42,735 (22.7%) |
| Japanese | 20,975 (8.5%) | 25,652 (13.6%) |
| French | 23,233 (9.4%) | 23,054 (12.3%) |
| Italian | 26,164 (10.6%) | 14,949 (8.0%) |
| Spanish | 34,425 (14.0%) | 21,312 (11.3%) |
| Portuguese | 21,023 (8.5%) | 7,551 (4.0%) |
| Total | 246,555 (100%) | 188,030 (100%) |

Once the initial set of labeled query terms is obtained, the remaining query terms are processed through the label propagation phase by utilizing the initial set of labeled query terms. The remaining query terms include query terms that are not determined to be nearest neighbors to any of the seed dictionary terms. Additionally or alternatively, the remaining query terms include query terms that are retrieved from additional sources. At step 210, the label propagation engine 144 may identify nearest neighbors of each remaining query term. Candidate data elements that constitute nearest neighbors of the remaining query terms are the initial set of labeled query terms. In other words, the label propagation engine 144 finds the query terms annotated at step 206 (i.e., labeled query terms) that are nearest to each remaining query term. In one embodiment, the query pool comprising the query terms is chosen by stratified sampling of queries over a time period (e.g., 1-year period, 2-year period, etc.). Such stratified sampling ensures representation of head, torso, and tail queries across languages.

Similar to step 204, the nearest labeled query terms are found using a kNN model in one embodiment, with the constant k defining the number of nearest labeled query terms to be identified. For each remaining query term, a predefined number (i.e., k) of nearest labeled query terms are found based on the distances (e.g., Euclidean distances) between the remaining query term and the labeled query terms. In other embodiments, any suitable classification algorithm may be utilized to find labeled query terms that are most similar (in terms of distance, proximity, or closeness) to each remaining query term.

Additionally, a subset may be generated from the predefined number of nearest labeled query terms, reducing the size of the nearest neighbor pool for performance reasons. The step of further reducing the size of the nearest neighbor pool is optional. The subset is generated by selecting, among the predefined number of nearest labeled query terms, labeled query terms with similarity to the remaining query term above a specified threshold. Then, if the number of labeled query terms in the subset exceeds a threshold length (i.e., a threshold number), a majority vote is taken to annotate the remaining query term.

At step 212, the label propagation engine 144 determines a label (i.e., a language) with majority vote for each remaining query term, based on the nearest neighbors (i.e., nearest labeled query terms) identified for the remaining query term. The language associated with the most number of nearest neighbors is assigned to the remaining query term. When there is a tie, a tie-breaking scheme can be applied by increasing or decreasing the value of the predefined number (i.e., k) until the tie is broken. The nearest neighbor pool upon which the majority vote is taken includes the predefined number of labeled query terms or the further-reduced subset of labeled query terms. In other embodiments, a different voting scheme is used such as, for example, a soft voting scheme, a weighted voting scheme, etc. At step 214, the label propagation engine 144 obtains a final set of labeled (i.e., weak-labeled) query terms upon the annotation process at step 212. The final set of labeled query terms includes the remaining query terms to which labels are propagated via steps 210-212, in addition to the initial set of labeled query terms obtained at step 208. The final set thus includes query terms that are labeled via the label creation and propagation phases of method 200, and constitutes training data to be provided to a machine learning model configured for language identification.

Table 2 below shows results of the experiment performed in accordance with the above-described label creation and propagation phases, for which certain particulars were described previously in reference to Table 1. Specifically, Table 2 shows distribution of language labels in the generated training data. In the experiment, the label creation and propagation phases provided approximately 664,000 annotated/labeled queries for training a machine learning model. Approximately 90% of this data was used for model training, with about 5% reserved for tuning and another 5% for evaluation. A human-annotated evaluation set was additionally generated due to the noise in this evaluation data set and to validate the efficacy of the weak-labeling technique proposed herein.

TABLE 2

| Language | Queries |
|---|---|
| English | 124,472 (18.7%) |
| German | 122,951 (18.5%) |
| Japanese | 56,707 (8.5%) |
| French | 62,787 (9.5%) |
| Italian | 33,332 (5.0%) |
| Spanish | 53,878 (8.1%) |
| Portuguese | 12,400 (1.9%) |
| Other | 197,744 (29.8%) |
| Total | 664,271 (100%) |

Figure 3A:
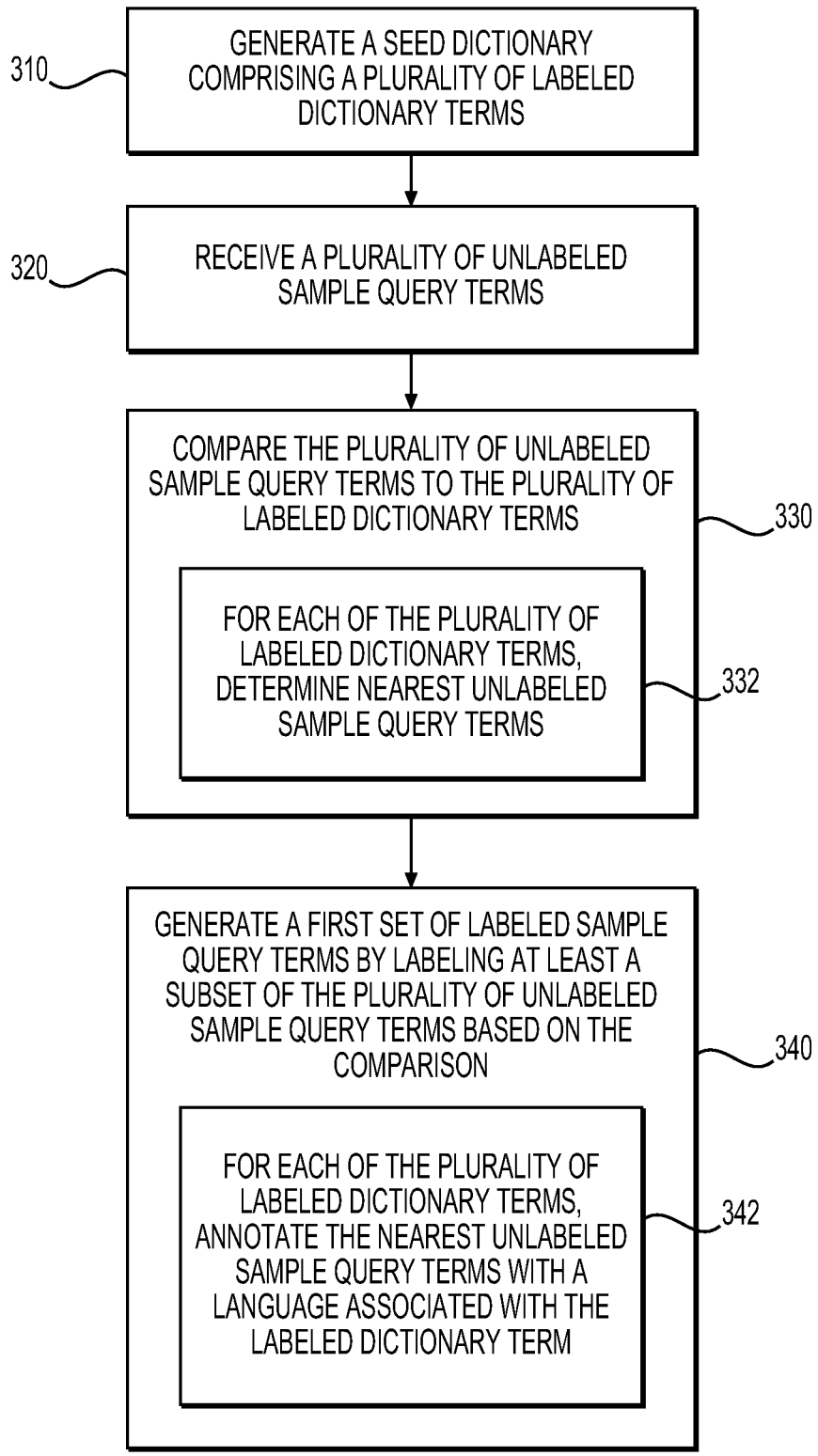
FIG. 3A is a flowchart illustrating an exemplary method of annotating query terms based on a seed dictionary, according to one aspect of the current disclosure.

FIG. 3A is a flowchart illustrating an exemplary method of annotating query terms based on a seed dictionary, according to one aspect of the current disclosure. Notably, method 300 illustrates the label creation phase discussed above in reference to FIG. 2 in a more general, simplified manner for ease of understanding. Accordingly, method 300 is performed by the label creation engine 142.

At step 310, the label creation engine 142 generates a seed dictionary comprising a plurality of labeled dictionary terms. Alternatively, the label creation engine 142 receives a seed dictionary that has been already complied at a remote location (e.g., a remote server). At step 320, the label creation engine 142 receives a plurality of unlabeled sample query terms from one or more query logs stored locally or remotely.

At step 330, the label creation engine 142 compares the plurality of unlabeled sample query terms to the plurality of labeled dictionary terms in the seed dictionary. Specifically, the comparison at step 330 determines, for each of the plurality of labeled dictionary terms, nearest unlabeled sample query terms (i.e., unlabeled sample query terms most similar to each labeled dictionary term) (step 332). In one embodiment, the nearest unlabeled sample query terms are found using a kNN model. In the case of using the kNN model, a predefined number (i.e., k) of nearest unlabeled sample query terms relative to a corresponding labeled dictionary term are found. In other embodiments, any suitable similarity analysis technique may be used to find the nearest unlabeled sample query terms. The number of nearest unlabeled sample query terms to be identified for each corresponding labeled dictionary term is configurable by the programmer, developer, or an administrator of the language determination system 100.

Once the nearest unlabeled sample query terms are identified for each labeled dictionary term, at step 340, the label creation engine 142 generates a first set of labeled sample query terms (i.e., weak-labeled sample query terms) by labeling at least a subset of the plurality of unlabeled sample query terms based on the comparison at step 330. More particularly, the first set of labeled sample query terms is generated by, for each of the plurality of labeled dictionary terms, annotating the nearest unlabeled sample query terms (determined at step 332) with a language associated with the corresponding labeled dictionary term (step 342). This way, the nearest unlabeled sample query terms identified for each labeled dictionary term inherit the label of that dictionary term, and become labeled sample query terms (i.e., weak-labeled sample query terms).

Figure 3B:
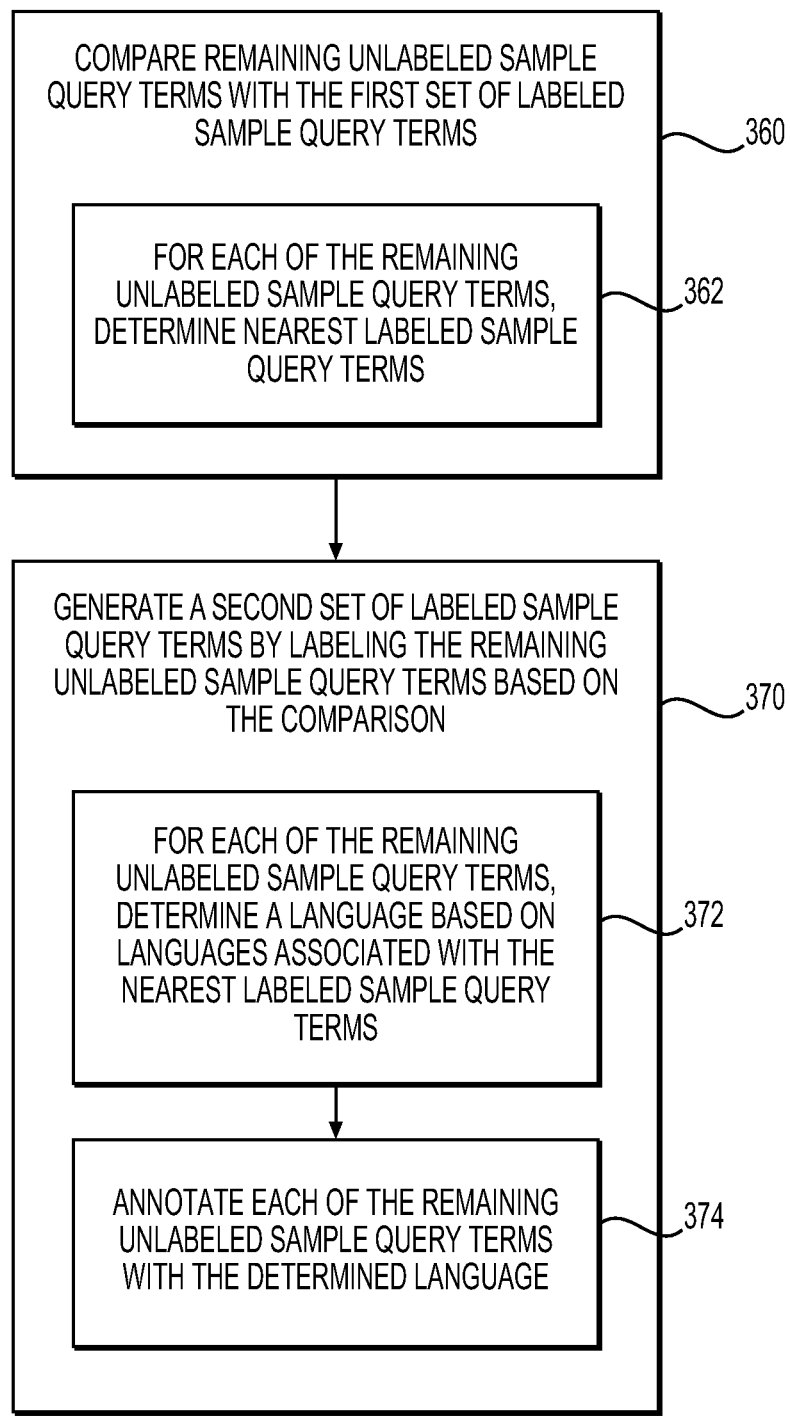
FIG. 3B is a flowchart illustrating an exemplary method of annotating remaining query terms based on labeled query terms, according to one aspect of the current disclosure.

FIG. 3B is a flowchart illustrating an exemplary method of annotating remaining query terms based on labeled query terms, according to one aspect of the current disclosure. Notably, method 350 illustrates the label propagation phase discussed above in reference to FIG. 2 in a more general, simplified manner for ease of understanding. Accordingly, method 350 is performed by the label propagation engine 144, once method 300 has been completed by the label creation engine 142.

At step 360, the label propagation engine 144 compares remaining unlabeled sample query terms with the first set of labeled sample query terms generated at step 340 of FIG. 3A. As explained above, the remaining query terms include query terms that are not determined to be nearest neighbors to any of the seed dictionary terms. Alternatively, the remaining query terms include additional query terms that are retrieved from additional sources. Specifically, the comparison at step 360 determines, for each of the plurality of remaining unlabeled sample query terms, nearest labeled sample query terms among the first set of labeled sample query terms (i.e., labeled sample query terms most similar to each remaining unlabeled sample query term) (step 362). In one embodiment, the nearest labeled sample query terms are found using a kNN model. In the case of using the kNN model, a predefined number (i.e., k) of nearest labeled sample query terms relative to a corresponding remaining unlabeled sample query term are found. In other embodiments, any suitable similarity analysis technique may be used to find the nearest labeled sample query terms. The number of nearest labeled sample query terms to be identified for each corresponding remaining unlabeled sample query term is configurable by the programmer, developer, or an administrator of the language determination system 100.

Once the nearest labeled sample query terms are identified for each remaining unlabeled sample query term, at step 370, the label propagation engine 144 generates a second set of labeled sample query terms (i.e., weak-labeled sample query terms) by labeling the remaining unlabeled sample query terms based on the comparison at step 360. Particularly, the second set of labeled sample query terms is generated by, for each of the remaining unlabeled sample query terms, i) determining a language based on languages associated with the nearest labeled sample query terms (step 372) identified for the corresponding remaining unlabeled sample query term, and ii) annotating each of the remaining unlabeled sample query terms with the determined language (step 374). In other words, each remaining unlabeled sample query term is annotated with a language that is selected from languages associated with the nearest labeled sample query terms. To that end, the language associated with the most number of nearest labeled sample query terms is assigned to the remaining unlabeled sample query term. As alluded to above in reference to FIG. 2, the nearest neighbor pool upon which the majority vote is taken includes the entire pool of nearest labeled sample query terms determined for each remaining unlabeled sample query term, or a further-reduced subset of the neighbor pool for performance reasons.

The first set of labeled sample query terms generated at step 340 and the second set of labeled sample query terms generated at step 370 together form a final set of labeled sample query terms (i.e., weak-labeled sample query terms). The final set thus includes sample query terms that are labeled via the label creation phase of method 300, and the label propagation phase of method 350, and constitutes training data to be provided to a machine learning model configured for language identification.

FIG. 4A is a flowchart illustrating an exemplary method of training a machine learning model, according to one aspect of the current disclosure. Notably, method 400 is performed by the model training system 120. At step 410, the model training system 120 receives a plurality of labeled sample query terms from one or more sample data sources (e.g., from the training data determination system 140). As explained above, the plurality of labeled sample query terms includes the final set of labeled sample query terms generated via methods 300 and 350 (i.e., method 200), comprising sample query terms annotated with corresponding languages predicted by the training data determination system 140. The plurality of labeled sample query terms constitute training data for the machine learning model.

At step 420, the model training system 120 trains a machine learning model using the plurality of labeled sample query terms, to predict a language of each of the plurality of labeled sample query terms. As explained above, the machine learning model is a GBT model such as, e.g., Xgboost, CatBoost, LightGBM, etc., or any other machine learning model suitable for language identification. In one embodiment, CatBoost is preferred over other GBT algorithms.

Additionally, the plurality of labeled sample query terms, i.e., weak-labeled sample query terms, are supplemented with human-annotated query terms to improve performance of the machine learning model. Specifically, the trained machine learning model is evaluated against human-annotated query terms (i.e., evaluation data set) to fine-tune model parameters. While it is not a requirement, the evaluation data set may be significantly smaller than the weak-labeled training data set. In other words, the weak-labeling phase is designed to provide a large training data set, while a comparatively smaller evaluation data set is generated for model evaluation and tuning. To that end, at step 430, the model training system 120 generates an evaluation data set for fine-tuning the machine learning model. FIG. 4B is a flowchart illustrating the evaluation data set generation, according to one aspect of the current disclosure.

Method 450 is performed by the model training system 120. At step 460, the model training system 120 determines a plurality of outputs of the machine learning model, each output comprising a query term and a language predicted for that query term by the machine learning model. At step 470, the model training system 120 selects, for each language (i.e., for each target language), a predefined number of outputs comprising query terms predicted to be in that language. To ensure accuracy of the manual annotation process, at step 480, the model training system 120 supplements the predefined number of outputs selected for each language with a predefined number of sample query terms associated with one or more other languages (i.e., mixed-in sample query terms). The mixed-in sample query terms include sample query terms that have been weakly labeled with one or more languages different from the target language. The selected outputs and the mixed-in sample query terms will be the subject of manual annotation by humans, thus generating evaluation data sets.

In summary, a portion of the outputs of the machine learning model in training are examined and manually annotated through a crowd-sourcing task. Further, sample query terms from other languages may be mixed in to ensure proper annotation. In one embodiment, mixed-in queries are focused on English and on languages that are likely to be confused with the target language. To further improve accuracy, a task may be formed for each target language with instructions provided only in that language. Additional details on the generation of evaluation data sets will be provided below, which describe the experiment performed in accordance with the techniques proposed in the current disclosure.

Referring back to FIG. 4A, at step 440, the model training system 120 stores the trained machine learning model in a remote or local storage. The trained machine learning model is later transmitted or made available to the language determination engine 110.

In order to select an optimal machine learning model, an experiment (in line with the particulars of the experiment described in reference to Table 1) was conducted to evaluate the accuracy and reliability of the above-referenced GBT algorithms (e.g., CatBoost, Xgboost, and LightGBM). In addition to query vectors representative of the plurality of labeled sample query terms, additional parameters were provided to each model that represent the fraction of character-set per language. To generate these parameters, a character set was determined for each language. For example, with respect to English, the character set was the 26 letters of the lower-cased alphabet and 10 digits. For each query (i.e., for each query term), the percentage of the characters in the query from each language was computed. As an example, a Japanese query ジンボはリンゴを食べる would have an English-fraction of 0, German-fraction of 0, French-fraction of 0, Italian-fraction of 0, Spanish-fraction of 0, Portuguese-fraction of 0, Korean-fraction of 0, and Japanese-fraction of 1.0. Each query was converted to a feature vector of length 109, comprising a 100 dimension fastText vector and 9 language-fractions per language (e.g., English, French, German, Italian, Japanese, Korean, Portuguese, Spanish, unknown). The experiment showed that, of the three algorithms trained, CatBoost was the clear winner. However, it should be noted that any of the GBT algorithms discussed in the present disclosure may be used to identify a language of a query, and that any other machine learning models suitable for language identification can also be used.

As explained above in reference to step 430 of FIG. 4A and the corresponding steps of FIG. 4B, since the training data generated by methods 300 and 350 (i.e., method 200) consisted only of "weak" labels, an evaluation data set (i.e., human-annotated evaluation data set) was created via a crowd sourced task in the experiment. Such an evaluation data set was created for each language to be predicted. To create the query set to be labeled by human annotators, weak-labeled sample query terms were passed to the machine learning model (e.g., CatBoost), generating language labels and prediction scores for the sample query term. Using the generated labels, a predefined number (e.g., 10,000) of query terms were selected for each predicted language for manual annotation. Since these were predicted labels, the actual language distribution of each evaluation data set varied.

The predefined number of query terms selected for each language were further supplemented with a predefined number (e.g., 1,000-2,000) of query terms from other languages to ensure that the human judges were on task. As an example, English was mixed in with all the languages based on an assumption that it is used in most locales and most human annotators know some English. As another example, Korean query terms were mixed in with Japanese query terms to ensure the annotators are not simply judging based on a non-Latin character set. As yet another example, Portuguese and Spanish were mixed with each other since the annotators might frequently confuse them. The targeted mix for each language test set is shown below in Table 3. All sets aimed for 10,000 query terms in the target language.

TABLE 3

| Target Language | 10,000 Core Queries | Mixed-In Queries |
|---|---|---|
| English | 90% English | 10% Unknown |
| German | 80% German | 20% English |
| French | 80% French | 20% English |
| Japanese | 80% Japanese | 10% English, 10% Korean |
| Spanish | 80% Spanish | 10% English, 10% Portuguese |
| Portuguese | 80% Portuguese | 10% English, 10% Spanish |
| Italian | 80% Italian | 20% English |

The languages of the mixed-in query terms were determined by the labels predicted by the model (i.e., weak labels) and therefore were not always accurate. Only query terms with a model probability exceeding 99% were mixed in. With this threshold, initial inspection by language experts indicated that the labels were accurate enough to ensure a mix of languages despite some errors. This was confirmed empirically by subsequent human labeling. It is noted that the model probability threshold explicitly discussed herein (i.e., 99%) is merely a value used in the discussed experiment. Any suitable threshold may be set depending on conditions of the environment to which the proposed techniques are applied. For example, a different threshold may be used in an application where there are relatively fewer query terms available (e.g., because the search engine providing the query terms was recently launched).

To further ensure the quality of manual annotation, language experts labeled approximately 1,000 queries for each language to use as test queries/test set ("honeypots") within each task. To further ensure that only annotators who knew the language in question performed the task, the instructions were posted for each language task only in that language. This way, only annotators who could read the language in question could participate in the task.

To evaluate the performance of the machine learning model, i.e., the CatBoost model determined to be the most accurate and reliable among the three GBT algorithms discussed above, the CatBoost model was compared with three baseline systems. The baseline systems included the following two publicly-available machine learning models and one heuristic method:

fastText: based on subword features used in the fastText classification models;

langid.py: trained over a naive Bayes classifier with a multinomial event model, over a mixture of byte n-grams (1≤n≤4), selecting features which are sensitive to language but not domain; and Heuristic: configured to determine the language of the locale (site url) for the search (a variant of majority wins).

The two publicly-available, off-the-shelf systems were trained on standard text, not on query text. Therefore, even though the sample query terms used standard vocabulary, especially nouns and adjectives, the fact that they were very short and had relatively few determiners, prepositions, and other closed class words suggested that these systems would not perform well.

The langid.py language detection model was chosen for comparison because it was reported to perform comparably to other language detection systems for longer text (i.e. Lang Detect, TextCat, and CLD) and better than certain systems designed for shorter text. However, the shorter text they were evaluated against included short user posts on social media platforms (i.e., tweets on Twitter), which are significantly longer than search queries. The fastText language detection model was chosen for comparison because it was reported to be more accurate and faster than the langid.py model. The fastText language detection model uses the subword features generally used in fastText classification models, and compresses the model through feature selection and weight quantization. In contrast, it was expected that the baseline of assuming the language of the query is the same as that of the locale would be a difficult baseline to beat, especially in English-speaking locales. In non-English-speaking locales, English queries often also occur. In fact, this mix of languages is the main motivation for creating a query language determination model contemplated by the current disclosure.

In the query logs used in the experiment, which included queries issued on sites not in one of the languages to be detected, 91% of unique queries (types) occurred on only one site, but the more frequent queries appeared on many sites with the result that 39% of query impressions (i.e., tokens) appear on only one site. In contrast, 1% of unique queries appeared on 5 or more sites, which correspond to 37% of query impressions. Table 4 below explains why locale in general is not enough to determine a query language. The third column of Table 4 indicates how many sites the query was issued on, while the forth column indicates how many of those sites had a locale which matched the language of the query (e.g. a German query on a German or Austrian site, an English query on a US, UK, Canadian, or Australian site).

TABLE 4

| Query | Language | # Sites Issued | # Matching Locale-Language |
|---|---|---|---|
| niños | Spanish | 5 | 2 |
| weihnachten | German | 10 | 2 |
| teamwork | English | 11 | 2 |
| teamwork | English | 9 | 4 |
| social media | English | 15 | 4 |

Table 5 below shows the comparison between the proposed model specially designed for relatively shorter text (i.e., CatBoost model), the two generic pre-trained models (i.e., fastText and langid.py), and the simple baseline of assuming that the query language is the same as that of the locale (i.e., heuristic). In all cases, the proposed model outperformed the pre-trained models in precision (the ratio of correctly predicted positive observations to the total predicted positive observations, i.e., true positives divided by the sum of true positives and false positives), recall (the ratio of correctly predicted positive observations to all observations in actual class "yes", i.e., true positives divided by the sum of true positives and false negatives), and F1 score (the weighted average of precision and recall, i.e., (2 * recall * precision)/(recall+precision)). The results of the fastText model were particularly interesting in that precision was significantly higher than recall for all languages except Japanese where the recall was perfect (i.e., it identified all the Japanese queries as Japanese) but the precision was very bad (i.e., it frequently identified non-Japanese queries as Japanese).

TABLE 5

| Language | CatBoost | | | langid.py | | | fastText | | | Heuristic | | |
|---|---|---|---|---|---|---|---|---|---|---|---|---|
| | Pre. | Recall | F1 | Prec. | Recall | F1 | Prec. | Recall | F1 | Prec. | Recall | F1 |
| English | 0.95 | 0.96 | 0.96 | 0.8 | 0.68 | 0.73 | 0.98 | 0.38 | 0.55 | 0.88 | 0.70 | 0.79 |
| German | 0.98 | 0.97 | 0.98 | 0.78 | 0.70 | 0.74 | 0.88 | 0.09 | 0.17 | 0.64 | 0.93 | 0.79 |
| Japanese | 1.00 | 0.99 | 0.99 | 1.00 | 0.80 | 0.89 | 0.31 | 1.00 | 0.47 | 0.93 | 0.97 | 0.95 |
| Spanish | 0.91 | 0.96 | 0.94 | 0.64 | 0.56 | 0.60 | 0.90 | 0.41 | 0.57 | 0.59 | 0.62 | 0.61 |
| French | 0.96 | 0.97 | 0.97 | 0.77 | 0.65 | 0.70 | 0.95 | 0.39 | 0.55 | 0.62 | 0.82 | 0.72 |
| Italian | 0.98 | 0.93 | 0.95 | 0.77 | 0.67 | 0.72 | 0.90 | 0.42 | 0.57 | 0.68 | 0.72 | 0.70 |
| Portuguese | 0.98 | 0.92 | 0.95 | 0.86 | 0.65 | 0.74 | 0.77 | 0.57 | 0.66 | 0.75 | 0.52 | 0.63 |

In comparison with the results shown in Table 5, the precision, recall, and F1 results for the model trained solely on such weak labeled data, without further fine-tuning (e.g., using evaluation sets), are shown below in Table 6. The results for the model trained on the weak-labeled sample queries in Table 6 indicated a moderate decline in performance compared to the results for the final proposed model (which was further evaluated against the true, gold standard data (i.e., evaluation data sets)) shown above in Table 5. These results suggest that the weak labeling process may not be entirely accurate and hence the final model trained and evaluated on both weak-labeled and human-annotated data may be substantially more accurate in predicting query languages. Nonetheless, with sufficient quantities of weak-labeled training data, the entire model training process, including parameter tuning, could be conducted solely on weak-labeled training data, and the resultant model could still provide an adequate level of performance. The human-annotated data might only be needed to confirm the exact performance of the system, a step which is needed to determine whether the system is accurate enough to use in practical settings.

TABLE 6

| Language | CatBoost | | |
|---|---|---|---|
| | Pre. | Recall | F1 |
| English | 0.90 | 0.78 | 0.83 |
| German | 0.90 | 0.94 | 0.92 |
| Japanese | 0.96 | 0.97 | 0.97 |
| Spanish | 0.81 | 0.89 | 0.85 |
| French | 0.89 | 0.92 | 0.90 |
| Italian | 0.78 | 0.83 | 0.81 |
| Portuguese | 0.73 | 0.41 | 0.53 |

Figure 5:
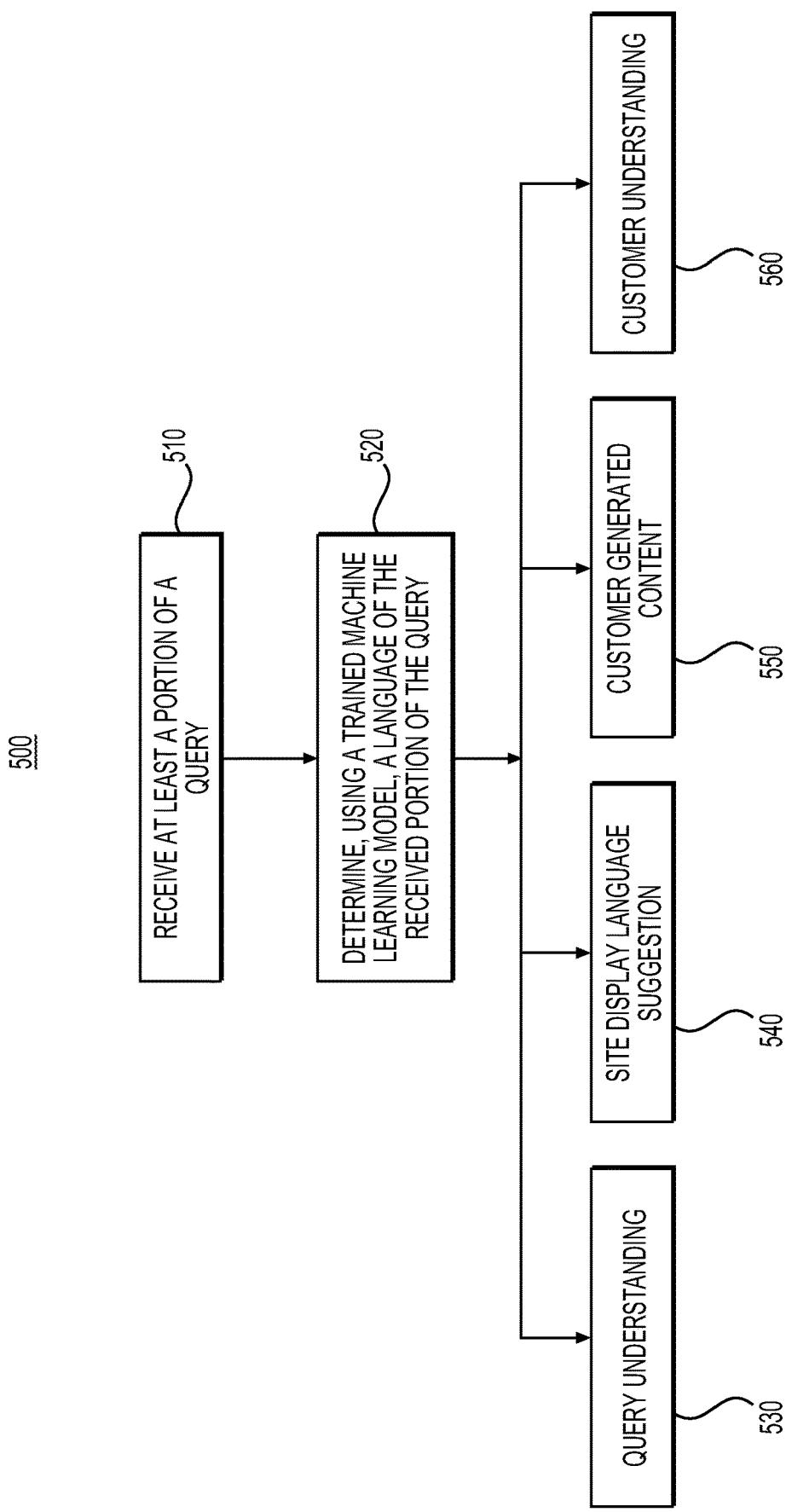
FIG. 5 is a flowchart illustrating an exemplary method of using a machine learning model to determine a language of a query, according to one aspect of the current disclosure.

FIG. 5 is a flowchart illustrating an exemplary method of using a machine learning model to determine a language of a query, according to one aspect of the current disclosure. In particular, FIG. 5 illustrates various use cases of the language determination system 100 contemplated in the current disclosure. Notably, method 500 is performed by the language determination engine 110. In some embodiments, the language determination engine 110 performs method 500 together with a software application or another platform in communication, to analyze queries for language determination and utilize the results in various ways that improve user experience and/or extract useful insights about the queries. For the sake of brevity, the language determination engine 110 and software application or platform communicably coupled thereto will together be referred to as the language determination engine 110.

At step 510, the language determination engine 110 receives at least a portion of a query (i.e., a query term). A query includes one or more words that reflect subject matter a user intends to search for and receive relevant information. As discussed above, a query is generally shorter than document text (e.g., long sentences, one or more paragraphs, or the entire document), certain posts made by users online (e.g., tweets or other types of social media posts), and the like. However, it should be appreciated that the language determination engine 110 may process longer text and still provide reliable results. The techniques contemplated in the current disclosure are more effective in processing shorter text or queries, compared to conventional techniques that are signal-based and designed for longer text.

At step 520, the language determination engine 110 determines, using machine learning model trained by and received from the model training system 120, a language of the received portion of the query. As discussed above, the machine learning model is trained using a combination of weak-labeled training data set, human-annotated evaluation data set, and test data set for optimal language prediction capability. In other embodiments however, the machine learning model still reliably predicts even when trained solely on weak-labeled training data set.

Scenarios 530, 540, 550, and 560 illustrate different use cases in which the determined language of the query may be utilized. For example, the determined language can be used for query understanding (scenario 530), site display language suggestion (scenario 540), customer-generated content (scenario 550), and customer understanding (scenario 560). In the following paragraphs, each of the illustrated scenarios will be explained in greater detail.

Scenario 530: Query Understanding

Query Processing Selection: Query understanding involves processes like lemmatization, stemming, de-compounding, de-accenting, named entity recognition, part of speech tagging, dependency parsing, and mapping to semantic concepts either in an ontology or in an embedding space. These processes are language specific (e.g. how to lemmatize words (e.g. map plural nouns like "dogs" into singular forms like "dog," map progressive verbs like "sitting" to infinitive forms like "sit," etc.) and need to performed for each language. The proposed language determination techniques enable forming a precursor step that determines which language-specific version of process to select.

Null or Lower Result Recovery: When there are no or few search results for a query run on a particular website, the proposed language determination techniques are executed to identify the correct language of the query. If the determined language does not match the language of the site, (1) the query is translated into the language of the site, (2) processing steps specific to the determined language are executed and search is performed based on the determined language, or (3) the query is mapped into a language-independent space. For example, on a US site, a query written in the Russian language (e.g., белая собака) would return few results. Using the proposed language determination techniques, the correct language is predicted and the query gets translated (e.g., using machine translation) to a corresponding English term (e.g., white dog) which will return a large number of results. Alternatively or additionally, the query, upon its language being determined, is mapped to an abstract concept through a pivot dictionary or ontology and/or the query is used in an embedding-based search.

Autocomplete and Related Search Data: Autocomplete (i.e., type-ahead suggestions) and related searches (i.e., query suggestions or search suggestions) both rely on previous user queries to suggest queries to the current user. To be useful, these suggestions need to be in the language of the user. By executing the proposed language determination techniques on the potential query suggestions, only the suggestions in the appropriate language (e.g. the language that matches the site, the language of the user's browser, the language of the user's past n queries) are provided to the user.

Scenario 540: Site Display Language Suggestion

If the language determination engine 110 determines that a user is issuing queries in a language that does not match the language of the website, a message is displayed with an action link that allows the user to toggle the language of the entire site to the language associated with the queries.

Scenario 550: Customer Generated Content

Users want to see content in their language, e.g., in the language of their queries or questions. The proposed language determination techniques enable better matching between such user queries and relevant user generated content (e.g., forums, Q&A, etc.).

Scenario 560: Customer Understanding

Next Market Assessment: The proposed language determination techniques are executed either online or offline to extract insights about user interests and trends. For example, the language determination techniques are executed against large query logs to understand what languages the users are searching in, which will provide an insight as to what search features to build and which underserved markets to target and provide improved services to (e.g., markets or regions in which people are searching using languages other than English on .com sites).

The use case scenarios explicitly discussed herein are provided merely as examples, and the language determination techniques of the current disclosure are applicable in various settings.

Off-the-shelf language identification models are inaccurate for domain-specific search queries (e.g., search queries in a search domain of a specific software application or platform), as the queries do not contain signals that are readily available in relatively longer text. In order to train a language determination machine learning model designed for shorter text, the current disclosure introduces techniques to bootstrap domain-specific training data in a two-step process. First, a seed dictionary is compiled and used to find nearest neighbor queries for target languages using, for example, a KNN model. Then, the labels created for the queries using the seed dictionary and KNN model are propagated to their nearest neighbor queries from a stratified sample of in-domain queries. A GBT model (e.g., CatBoost) is then trained using multi-dimension fastText vectors and language-fraction features. A domain-specific evaluation data set is generated based on crowd-sourcing, focusing on the target languages. To ensure the attention of the human annotators, queries in other languages are mixed into each target language labeling task, and task instructions are provided only in the target language.

In conclusion, the label creation and propagation processes allow for generation of a large amount of training data, without having to manually annotate any or an entirety of the training samples. The additional steps for generating an evaluation data set via crowd-sourcing under strict guidelines further enhance the quality of the training data and eventually the model's prediction capability. Experimental results showed that overall accuracy (e.g., f-score on the model) and performance (e.g., inference latency on standard CPU machines used for query processing) of the machine learning model trained using the techniques contemplated in the current disclosure are suitable for query-time production use.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 6 illustrates an implementation of a computer system that may execute techniques presented herein. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 650 can communicate voice, video, audio, images, or any other data over the network 650. Further, the instructions 624 may be transmitted or received over the network 650 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 650, external media, the display 610, or any other components in system 600, or combinations thereof. The connection with the network 650 may be a physical connection, such as a wired Ethernet connection or may be established wirelessly as discussed below. Likewise, the additional connections with other components of the system 600 may be physical connections or may be established wirelessly. The network 650 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 650. The network 650 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 650 may include wide area networks (WAN), such as the Internet, local area networks (LAN), campus area networks, metropolitan area networks, a direct connection such as through a Universal Serial Bus (USB) port, or any other networks that may allow for data communication. The network 650 may be configured to couple one computing device to another computing device to enable communication of data between the devices. The network 650 may generally be enabled to employ any form of machine-readable media for communicating information from one device to another. The network 650 may include communication methods by which information may travel between computing devices. The network 650 may be divided into sub-networks. The sub-networks may allow access to all of the other components connected thereto or the sub-networks may restrict access between the components. The network 650 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method comprising:
generating, by a processing device, a seed dictionary of labeled dictionary terms in multiple different languages, each dictionary term including a label that indicates a language of the multiple different languages;
receiving, by the processing device, unlabeled sample query terms;
generating, by the processing device, a first set of labeled sample query terms that indicate a language of the multiple different languages of the unlabeled sample query terms by comparing a first set of the unlabeled sample query terms with the labeled dictionary terms;
receiving, by the processing device, additional unlabeled sample query terms from additional sources;
selecting, by the processing device, a predefined number of labeled sample query terms of the first set of labeled sample query terms having a threshold level of similarity to remaining query terms that include the additional unlabeled sample query terms from the additional sources and include query terms that are omitted from a determined group of nearest neighbors to the labeled dictionary terms;
generating, by the processing device, a second set of labeled sample query terms that indicate a language of the remaining query terms by comparing a second set of the unlabeled sample query terms with the predefined number of labeled sample query terms;
predicting, by the processing device, a query language using a machine learning model based on the first and second sets of labeled sample query terms; and
generating, by the processing device, text in the query language for display in a user interface.

2. The method of claim 1, wherein the first set of labeled sample query terms are selected based on stratified sampling of queries over a time period.

3. The method of claim 1, wherein generating the first set of labeled sample query terms includes determining a predefined number of unlabeled sample query terms that are nearest to a labeled dictionary term.

4. The method of claim 3, wherein the predefined number of unlabeled sample query terms are determined using a k Nearest Neighbor (kNN) model.

5. The method of claim 3, wherein generating the first set of labeled sample query terms includes annotating the predefined number of unlabeled sample query terms with a language associated with the labeled dictionary term.

6. The method of claim 3, wherein generating the second set of labeled sample query terms includes determining a predefined number of labeled sample query terms that are nearest to an unlabeled sample query term.

7. The method of claim 6, wherein the predefined number of labeled sample query terms are determined using a k Nearest Neighbor (kNN) model.

8. The method of claim 6, wherein determining the predefined number of labeled sample query terms further includes:
   identifying a language associated with the predefined number of labeled sample query terms; and
   annotating the unlabeled sample query term with the language associated with the predefined number of labeled sample query terms.

9. The method of claim 8, wherein the language associated with the predefined number of labeled sample query terms is identified using a voting scheme based on the language of most of the labeled sample query terms that are nearest to the unlabeled sample query term.

10. The method of claim 1, further comprising:
   receiving a query term from a user application;
   determining, using the machine learning model, a language of the query term; and
   changing a data element for display in a user interface based on the language of the query term.

11. The method of claim 1, wherein comparing the second set of the unlabeled sample query terms with the first set of labeled sample query terms further comprises generating a subset of the first set of labeled sample query terms based on a predefined number of labeled sample query terms that are nearest to the unlabeled sample query terms.

12. The method of claim 11, further comprising labeling an unlabeled sample query term if a number of labeled query terms in the subset of the first set of labeled sample query terms exceeds a threshold number.

13. A system comprising:
   a memory component; and
   a processing device coupled to the memory component, the processing device to perform operations comprising:
      generating a seed dictionary of labeled dictionary terms in multiple different languages, each dictionary term including a label that indicates a language of the multiple different languages;
      receiving unlabeled sample query terms;
      generating a first set of labeled sample query terms that indicate a language of the multiple different languages of the unlabeled sample query terms by comparing a first set of the unlabeled sample query terms with the labeled dictionary terms;
      receiving additional unlabeled sample query terms from additional sources;
      selecting a predefined number of labeled sample query terms of the first set of labeled sample query terms having a threshold level of similarity to remaining query terms that include the additional unlabeled sample query terms from the additional sources and include query terms that are omitted from a determined group of nearest neighbors to the labeled dictionary terms;
      generating a second set of labeled sample query terms that indicate a language of the remaining query terms by comparing a second set of the unlabeled sample query terms with the predefined number of labeled sample query terms;
      predicting a query language using a machine learning model based on the first and second sets of labeled sample query terms; and
      generating text in the query language for display in a user interface.

14. The system of claim 13, wherein generating the first set of labeled sample query terms includes determining a predefined number of unlabeled sample query terms that are nearest to a labeled dictionary term.

15. The system of claim 14, wherein generating the second set of labeled sample query terms includes determining a predefined number of labeled sample query terms that are nearest to an unlabeled sample query term.

16. The system of claim 15, wherein determining the predefined number of labeled sample query terms further includes:
   identifying a language associated with the predefined number of labeled sample query terms; and
   annotating the unlabeled sample query term with the language associated with the predefined number of labeled sample query terms.

17. A non-transitory computer-readable storage medium storing executable instructions, which when executed by a processing device, cause the processing device to perform operations comprising:
   receiving a portion of a query; and
   using a machine learning model trained on weak-labeled data to determine a language of the portion of the query by:
      generating a seed dictionary of labeled dictionary terms in multiple different languages, each dictionary term including a label that indicates a language of the multiple different languages;
      receiving unlabeled sample query terms;
      generating a first set of labeled sample query terms that indicate a language of the multiple different languages of the unlabeled sample query terms by comparing a first set of the unlabeled sample query terms with the labeled dictionary terms;
      receiving additional unlabeled sample query terms from additional sources;
      selecting a predefined number of labeled sample query terms of the first set of labeled sample query terms having a threshold level of similarity to remaining query terms that include the additional unlabeled sample query terms from the additional sources and include query terms that are omitted from a determined group of nearest neighbors to the labeled dictionary terms;
      generating a second set of labeled sample query terms that indicate a language of the remaining query terms by comparing a second set of the unlabeled sample query terms with the predefined number of labeled sample query terms;
      predicting a query language using a machine learning model based on the first and second sets of labeled sample query terms; and
      generating text in the query language for display in a user interface.

18. The non-transitory computer-readable storage medium of claim 17, wherein generating the first set of labeled sample query terms includes determining a predefined number of unlabeled sample query terms that are nearest to a labeled dictionary term and annotating the predefined number of unlabeled sample query terms with a language associated with the labeled dictionary term.

19. The non-transitory computer-readable storage medium of claim 18, wherein generating the second set of labeled sample query terms includes determining a predefined number of labeled sample query terms that are nearest to an unlabeled sample query term.

20. The non-transitory computer-readable storage medium of claim 19, wherein determining the predefined number of labeled sample query terms further includes:
   identifying a language associated with the predefined number of labeled sample query terms; and
   annotating the unlabeled sample query term with the language associated with the predefined number of labeled sample query terms.

* * * * *